(12) United States Patent
Schultz et al.

(10) Patent No.: US 8,225,187 B1
(45) Date of Patent: Jul. 17, 2012

(54) METHOD AND APPARATUS FOR IMPLEMENTING A CYCLIC REDUNDANCY CHECK CIRCUIT

(75) Inventors: David P. Schultz, San Jose, CA (US); Christopher D. Ebeling, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 1143 days.

(21) Appl. No.: 12/059,773

(22) Filed: Mar. 31, 2008

(51) Int. Cl.
*G06F 11/00* (2006.01)

(52) U.S. Cl. .................................... 714/807

(58) Field of Classification Search .................. 714/807, 714/808
See application file for complete search history.

(56) References Cited

U.S. PATENT DOCUMENTS

| | | | | |
|---|---|---|---|---|
| 6,836,869 | B1 * | 12/2004 | Wyland | 714/781 |
| 2005/0154960 | A1 * | 7/2005 | Sydir et al. | 714/758 |
| 2008/0092020 | A1 * | 4/2008 | Hasenplaugh et al. | 714/781 |

OTHER PUBLICATIONS

U.S. Appl. No. 11/265,815, filed Nov. 3, 2005, Bataineh, Khaldoun, "Method and Apparatus for a Modular, Programmable Cyclic Redundancy Check Design", Xilinx, Inc. 2100 Logic Drive, San Jose, CA 95124.

U.S. Appl. No. 11/032,396, filed Jan. 10, 2005, "Method and Apparatus for a Dedicated Cyclic Redundancy Check Block Within a Device", Xilinx, Inc. 2100 Logic Drive, San Jose, CA 95124.

UG189 (v1.2) "LogiCORE Virtex-5 CRC Wizard v1.1", User Guide, May 17, 2007, 34 pages, Xilinx, Inc. 2100 Logic Drive, San Jose, CA 95124.

XAPP562 (v1.1.1) Configurable LocalLink CRC Reference Design, Jayarajan, Nanditha, Virtex Series and Virtex-II Family, Apr. 20, 2007, 18 pages, Xilinx, Inc. 2100 Logic Drive, San Jose, CA 95124.

Morelos-Zaragoza, Robert H., "The Art of Error Correction Coding", Apr. 26, 2002, Wiley & Sons, Ltd., 2002, Chapter 3, pp. 33-44. ISBN 0471495816.

Easics NV, *CRC Tool*, downloaded Mar. 28, 2008, pp. 1-2, <http://www.easics.com/webtools/crctool/nav_dtml>, Easics NV, Leuven, Belgium.

* cited by examiner

*Primary Examiner* — Scott Baderman
*Assistant Examiner* — Yair Leibovich
(74) *Attorney, Agent, or Firm* — Gerald Chan; Thomas George

(57) ABSTRACT

A cyclic redundancy check (CRC) bit-slice circuit including a plurality of AND gates coupled with configuration data is described. The configuration data may enable the plurality of AND gates to provide a set of CRC input data and feedback polynomial data meeting a plurality of CRC protocols. The CRC bit-slice circuit accepts a generator polynomial as an input design parameter to build a CRC module. The modularity of the design then allows a larger CRC design to be constructed from multiple CRC modules such that wider data width may be accommodated. Several CRC modules can be cascaded to accommodate various data widths and to meet a plurality of CRC protocols.

19 Claims, 9 Drawing Sheets

Fig. 9b

METHOD AND APPARATUS FOR IMPLEMENTING A CYCLIC REDUNDANCY CHECK CIRCUIT

FIELD OF THE INVENTION

The present invention generally relates to an integrated circuit (IC), and more particularly to a cyclic redundancy check circuit of an IC.

BACKGROUND

Data communication systems continue to require advanced methods of error detection of data being communicated over a noisy channel. Corrupted data or data having errors can be dealt with in many ways including correcting the error; in other cases retransmission of the data may be required. An integrated circuit including cyclic redundancy check (CRC) circuits have often been employed by communication systems to implement such error detection. One type of integrated circuit may include an integrated circuit having programmable logic, e.g., programmable logic devices (PLDs). PLDs are a well-known type of integrated circuit that can be programmed to perform specified logic functions. One type of PLD, the field programmable gate array (FPGA), typically includes an array of programmable tiles. The aim of an error detection technique is to enable the receiver of a message transmitted through a noisy (error-introducing) channel to determine whether the message has been corrupted. To do this, the transmitter constructs a value (called a checksum) that is a function of the message, and appends it to the message. The receiver can then use the same function to calculate the checksum of the received message and compare it with the appended checksum to see if the message was correctly received.

The basic idea of CRC algorithms is simply to treat the message as an enormous binary number, to divide it by another fixed binary number, and to make the remainder from this division the checksum. Upon receipt of the message, the receiver can perform the same division and compare the remainder with the "checksum" (transmitted remainder). One method of implementing a CRC is to utilize a serial process, e.g., using a linear feedback shift register (LFSR), in which single bits of a frame of data are accumulated one cycle at a time, to generate a frame check sequence (FCS) to be appended to the end of the data frame to be transmitted.

In order to accommodate large data frames or large system throughput requirements, the CRCs may be expanded from the ability to handle single bits of data at each clock cycle, to the ability to handle multiple data bits, or words, in a single clock cycle. In order to generate CRCs for data words having widths greater than one bit, however, a different CRC circuit is required for each data word width that is to be processed.

For example, communication protocols often utilize data packets having any number of data bytes. Given that each data byte represents 8 bits, therefore, performing CRC calculations on each data byte requires an 8-bit CRC circuit. In order to increase system throughput the data can be processed in parallel. For example, a system could process eight of the 8-bit data words at the same time resulting in a 64-bit datapath. Other examples include CRC communication protocols having data widths less than 8 bits, e.g., 5 bits. Should CRC calculations be required on larger data blocks, however, a possibility exists that an un-processed data residue whose width is smaller than the current CRC handling width would need to be included in the current CRC calculation.

In such an instance, multiple CRC blocks having multiple widths may be incorporated into the design to handle the data residue widths that may be possible. For example, if byte-wide data is processed 8 bytes at a time in parallel, then, in general, CRC blocks having widths of 56, 48, 40, 32, 24, 16, and 8 bits would be necessary to handle the data residue widths that may result during CRC processing. Such a design could be size prohibitive.

Furthermore, other examples exist where data is received having fixed widths, but real time CRC processing on the variable size data blocks is still required. In such an instance, a highly configurable CRC circuit would be necessary to handle a variety of data widths.

A cyclic redundancy check (CRC) is a type of function that takes an input data stream of a predetermined length per design specification or standard and produces an output value of a known size in accordance with the standard. A CRC can be used in the same way as a checksum to detect error of data during transmission or storage. CRCs are widely used due to the ease of implementation and the ease to analyze mathematically, and are particularly good at detecting common errors caused by noise in transmission channels (e.g., a wired transmission channel on a printed circuit board). Errors in both data transmission channels and magnetic storage media tend to be distributed non-uniformly (i.e., are "bursty"), making CRCs' properties more useful than alternative schemes such as multiple parity checks.

Various standards, such as Institute of Electrical and Electronics Engineers (IEEE) standards, have adopted various CRC polynomials, which made it challenging for designers to design a single CRC circuit adaptable to the various standards. This is important for a general-purpose device such as a PLD which may support different communication standards. Table 1 illustrates some of the popular polynomials used in CRC calculations.

TABLE 1

| Name | Polynomial |
| --- | --- |
| CRC-1 | $x + 1$ (use: hardware; also known as parity bit) |
| CRC-5-ITU | $x^5 + x^4 + x^2 + 1$ (ITU G.704, p. 9) |
| CRC-5-USB | $x^5 + x^2 + 1$ (use: USB token packets) |
| CRC-6-ITU | $x^6 + x + 1$ (ITU G.704, p. 3) |
| CRC-7 | $x^7 + x^3 + 1$ (use: telecom systems, MMC) |
| CRC-8-CCITT | $x^8 + x^7 + x^3 + x^2 + 1$ (use: 1-Wire bus) |
| CRC-15-CAN | $x^{15} + x^{14} + x^{10} + x^8 + x^7 + x^4 + x^3 + 1$ |
| CRC-16-CCITT | $x^{16} + x^{12} + x^5 + 1$ (X.25, V.41, Bluetooth, PPP, IrDA, BACnet; known as "CRC-CCITT") |
| CRC-16-IBM | $x^{16} + x^{15} + x^2 + 1$ (XMODEM, USB, many others; also known as "CRC-16") |
| CRC-24-Radix-64 | $x^{24} + x^{23} + x^{18} + x^{17} + x^{14} + x^{11} + x^{10} + x^7 + x^6 + x^5 + x^4 + x^3 + x + 1$ |
| CRC-32-MPEG2 | $x^{32} + x^{26} + x^{23} + x^{22} + x^{16} + x^{12} + x^{11} + x^{10} + x^8 + x^7 + x^5 + x^4 + x^2 + x + 1$ |
| CRC-32-IEEE 802.3 | $x^{32} + x^{26} + x^{23} + x^{22} + x^{16} + x^{12} + x^{11} + x^{10} + x^8 + x^7 + x^5 + x^4 + x^2 + x + 1$ (V.42) |
| CRC-64-ISO | $x^{64} + x^4 + x^3 + x + 1$ (use: ISO 3309) |
| CRC-64-ECMA-182 | $x^{64} + x^{62} + x^{57} + x^{55} + x^{54} + x^{53} + x^{52} + x^{47} + x^{46} + x^{45} + x^{40} + x^{39} + x^{38} + x^{37} + x^{35} + x^{33} + x^{32} + x^{31} + x^{29} + x^{27} + x^{24} + x^{23} + x^{22} + x^{21} + x^{19} + x^{17} + x^{13} + x^{12} + x^{10} + x^9 + x^7 + x^4 + x + 1$ (as described in ECMA-182 p.63) |

As illustrated in Table 1, many leading technology companies, and standards bodies, such as USB, IEEE, and ITU, etc. have adopted various implementations of CRC calculations by alternative values of polynomials. The polynomial must be chosen to maximize the error detecting capabilities while minimizing overall collision probabilities. For instance, the most commonly used polynomial lengths are 9 bits, 17 bits, 33 bits, and 65 bits, or as commonly known CRC-8, CRC-16, CRC-32 and CRC-40, CRC-64 respectively.

A CRC building block uses a generator polynomial to build a CRC module, where the CRC module consists of at least two CRC circuits. The modularity of a CRC design allows a larger CRC module constructed from multiple CRC circuits, such that wider data, e.g., 64 bits, 128 bits, may be accommodated. In an example, a designer may incorporate added flexibility in a CRC design by having a programmable generator polynomial as an input design parameter. The above example allows the same CRC circuit to be used to support different standards or user defined generator polynomials.

SUMMARY

The various embodiments of the present invention disclose an apparatus and method for a modular cyclic redundancy check (CRC) generator, where a polynomial is defined as an input to the CRC design. The modular design allows building a CRC design capable of performing CRC calculations in accordance with a plurality of CRC protocols.

In accordance with an embodiment of the present invention provide an adaptable cyclic redundancy check (CRC) bit-slice circuit including a plurality of AND gates coupled to receive control signals, CRC feedback data, and CRC input data, a plurality of XOR gates coupled together forming an XOR tree having inputs coupled to receive outputs of the plurality of AND gates and provide an XOR tree output, and a register having an input coupled to receive the XOR tree output and provide a register output. The control signals configure width of the CRC input data and mask at least one bit of the CRC feedback data to meet a plurality of error detection protocols.

In accordance with another embodiment of the invention provide a method of performing cyclic redundancy check (CRC). The method includes coupling configuration data to a plurality of AND gates, coupling CRC data to the plurality of AND gates, coupling the plurality of AND gates to a CRC module, applying a portion of the configuration data to the plurality of AND gates, masking at least one bit of the CRC data, and performing CRC calculation on data provided by the plurality of AND gates. Where the coupled configuration data enables the CRC module to support a plurality of error detection protocols.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

FIG. 9b illustrates a set of CRC feedback configuration data pattern.

DETAILED DESCRIPTION OF THE DRAWINGS

According to one or more embodiments of the present invention, a highly configurable CRC design and method are described, where signals coupled to at least one configurable CRC block may configure a CRC module including the at least one configurable CRC block to support numerous CRC standards or may enable a user to create a design specific implementation of a CRC calculation.

Figure 1:
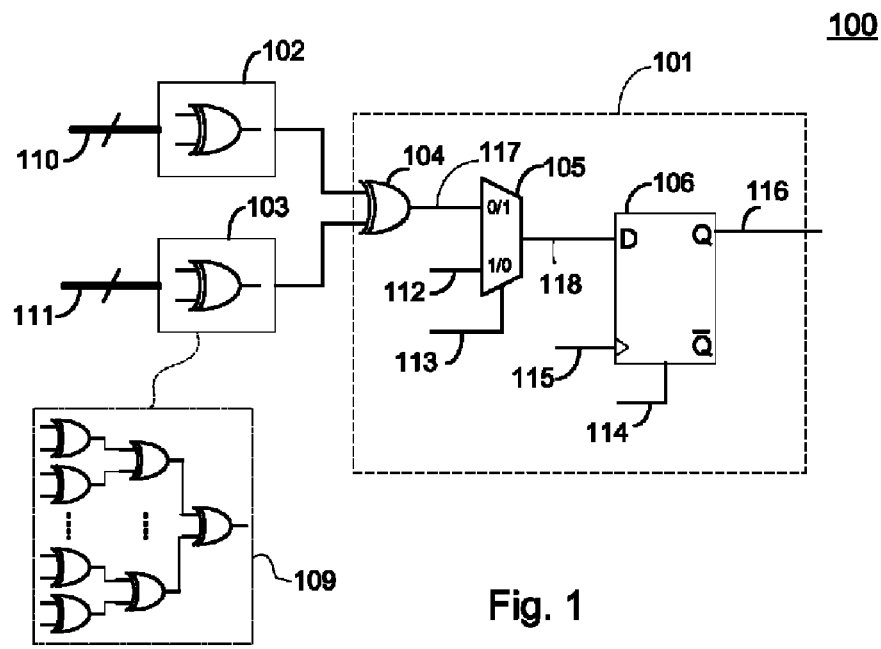
FIG. 1 illustrates a block diagram of a cyclic redundancy check (CRC) bit-slice.

FIG. 1 illustrates an example of a CRC bit-slice circuit. In general, a CRC block may include numerous CRC bit-slice circuits, for example, a CRC-8 would include eight CRC bit-slice circuits. A CRC bit-slice circuit as illustrated in FIG. 1 may include an XOR tree and a register having a data input coupled to an output of the XOR tree. For instance, the XOR tree of FIG. 1 may include a first XOR tree 102 and a second XOR tree 103, and XOR circuit 104 providing a CRC bit-slice output 117. For instance, XOR tree 102 may provide an output of the generator polynomial (signal 110), where XOR tree 103 may provide an output based on input data (signal 111). In general, an XOR tree may be a circuit including numerous XOR gates or circuits coupled in together as illustrated in circuit 109 of FIG. 1. XOR tree 103 may be coupled to receive numerous input signals and provide an output, where the output is a product of the XOR operation of all the input signals.

The CRC bit-slice circuit 100 may also include register 106. The register 106 may provide an output 116 synchronous with a clock signal 115. Signal 116 is the registered version of signal 118, and may be coupled to a bus including many registered outputs of CRC bit slice circuits as it will be described below with reference to FIG. 2. The CRC bit-slice circuit of FIG. 1 may also include a select circuit 105. Circuit 105 may be coupled to receive an output of the XOR circuit 104 and signal 112, where signal 112 may be a control signal that provides a predetermined data to register 106 when selected.

Figure 2:
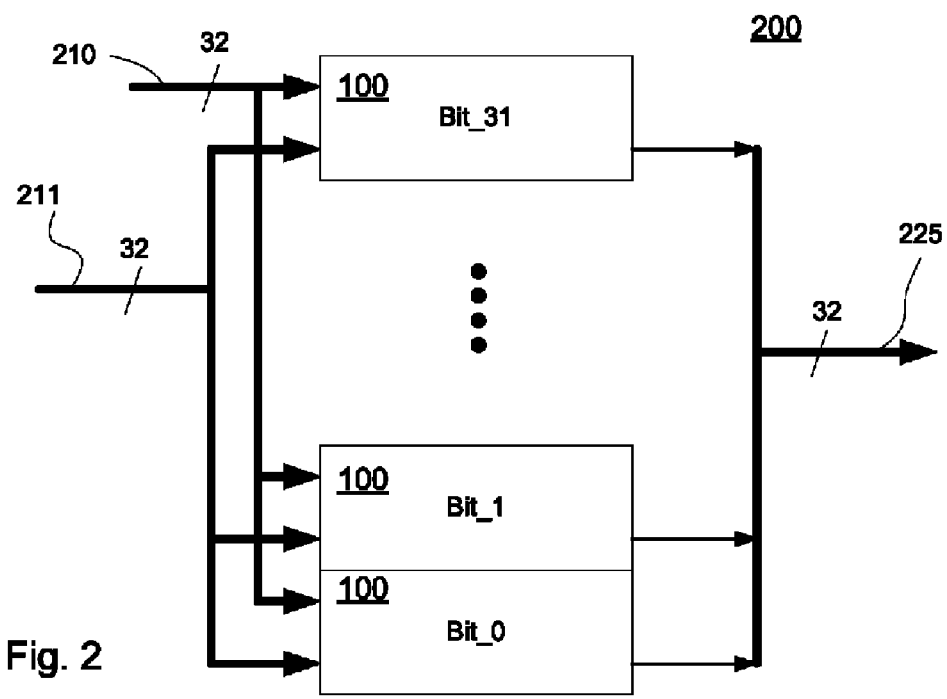
FIG. 2 illustrates a block diagram of a CRC 32 bit module.

As mentioned above, numerous CRC bit-slice circuits 100 may be needed to implement a CRC block. For example, FIG. 2 illustrates a 32 bit CRC block diagram including 32 instantiations of CRC bit-slice circuit 100. Circuit 200 illustrates that each CRC bit circuit may be coupled to receive a 32 bit input data 211 and a 32 bit generator polynomial data 210. The input data 211 is the data to be processed for errors by circuit 200 while signal 210 is the polynomial data that is used for calculation to detect such errors. Signal 210 may be coupled to receive data adhering to a specific standard, e.g., a CRC-32 polynomial standard, or a user defined generator polynomial data. Circuit 200 may provide output 225, where output 225 is the processed input data 211 with the generator polynomial data 210. Output 225 may include error information of the input data 211.

Figure 3:
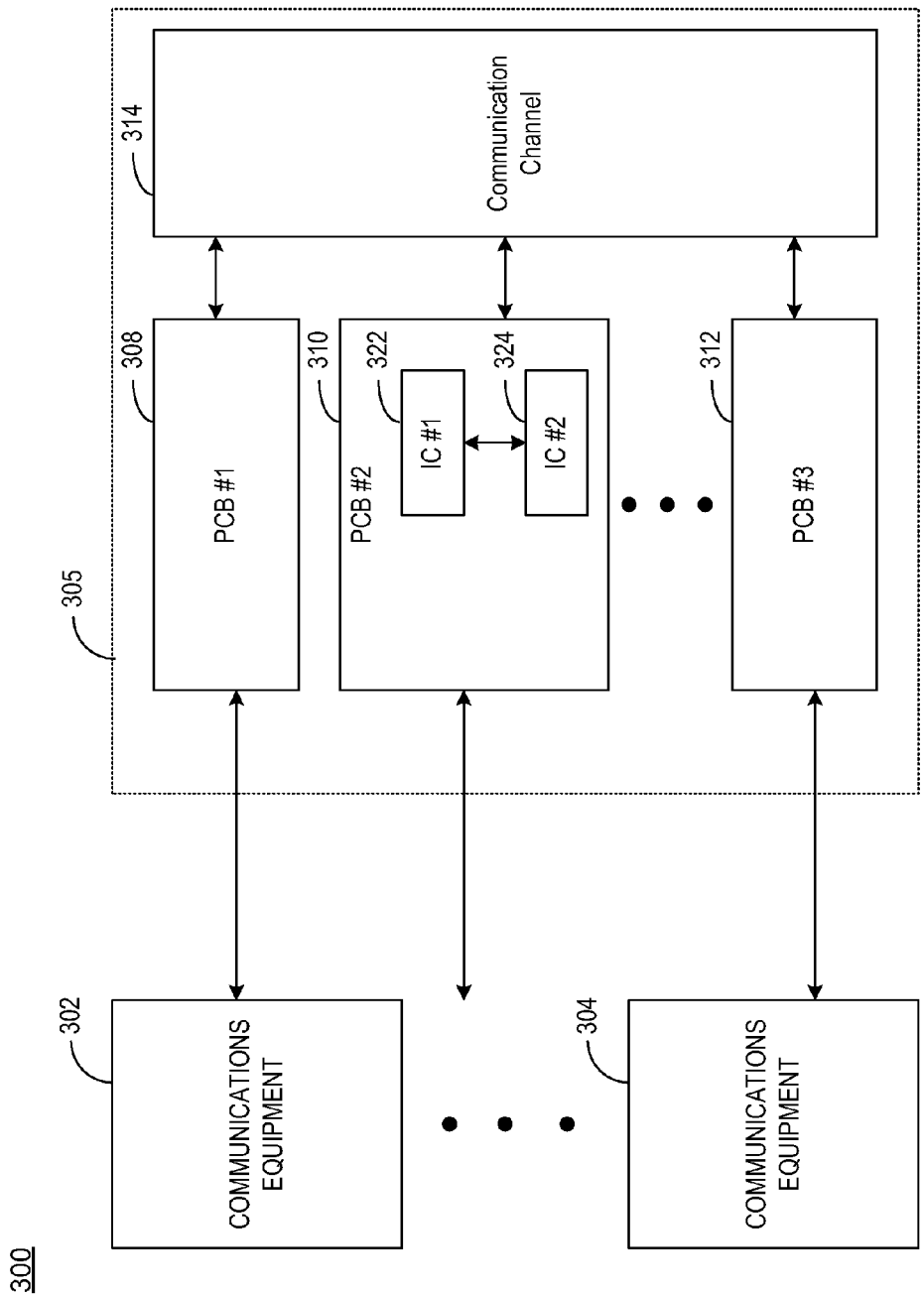
FIG. 3 illustrates a block diagram of a communication system.

Communication system 300 of FIG. 3, for example, is illustrated in which configurable CRC designs or modules may be utilized. Communications equipment blocks 302-305 may represent communicating entities, in which communication takes place at various levels and distances using various wired and/or wireless technologies.

Communications equipment blocks 302-304, for example, may communicate with communications block 305 via a Local Area Network (LAN) or Storage Network (SN) using technologies such as Gigabit Ethernet, or 10 Gigabit Ethernet, as specified by IEEE 802.3. Communication system 300 may designate a data center, storage network, or System Area Network (SAN), in which the Infiniband serial I/O interconnect architecture, or Fiber Channel, is utilized. In some embodiments, communication system 300 may represent a Synchronous Optical NETwork (SONET) or Synchronous Digital Hierarchy (SDH) employed by many Internet Service Providers (ISPs) and other high bandwidth end users.

Still other communication technologies supported by communication system 300 may include Peripheral Component Interconnect (PCI), PCI-Express, RapidIO, and Serial Advanced Technology Attachment (SATA). Such communication standards may be implemented, for example, to support communications between printed circuit boards (PCBs) 308-312, integrated circuits (ICs) 322-324, and communication channel 314. Communication channel 314 may be a printed circuit board (PCB) utilized as a backplane, a wired medium, or a wireless medium implemented for the purpose of communication. As can be recognized by one of ordinary skill in the art, any number of communication standards may be supported.

Figure 4:
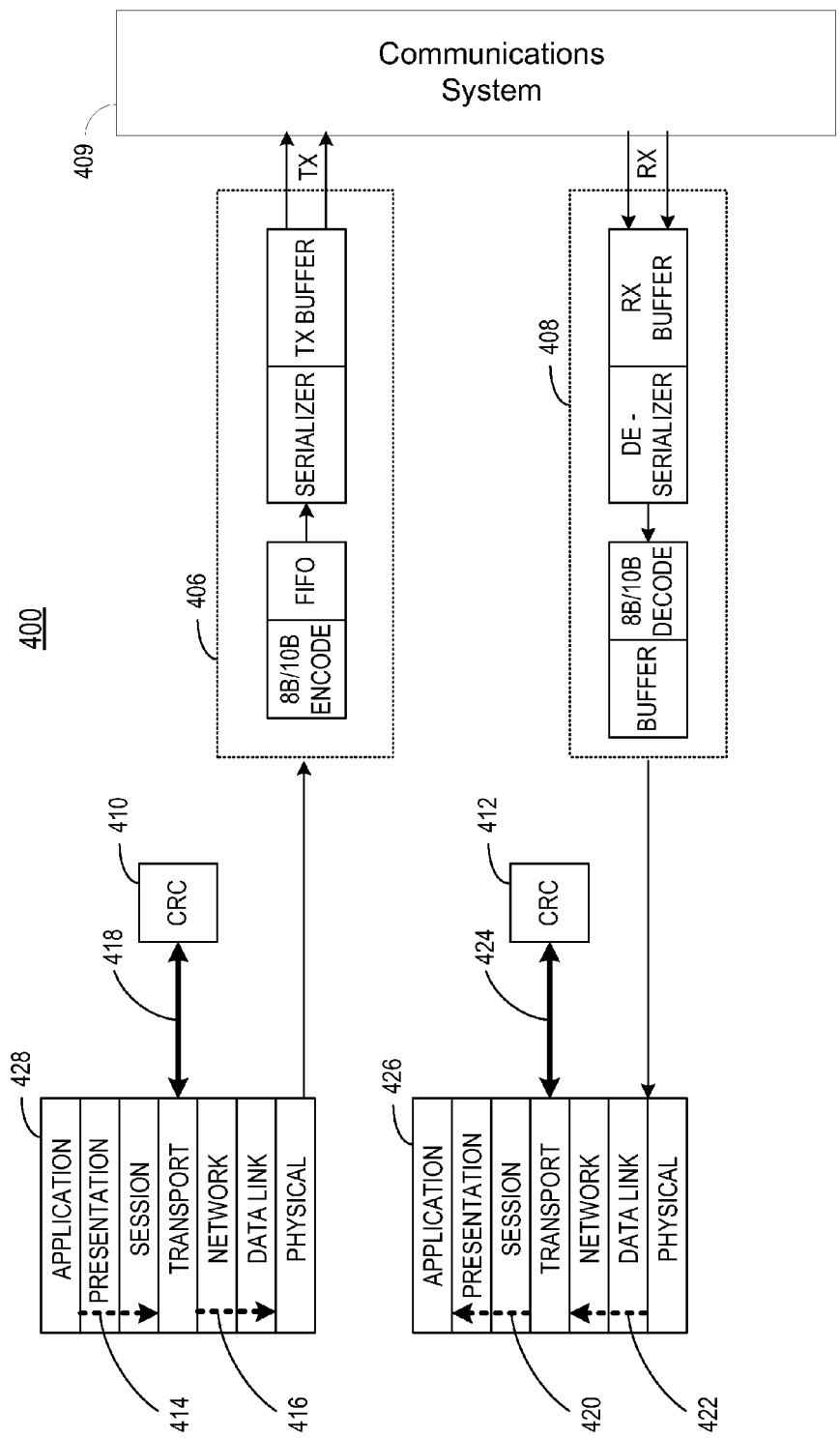
FIG. 4 illustrates a transmitter and a receiver block diagrams including CRC modules.

In another example of a communication system, FIG. 4 illustrates a communication block diagram 400 in which transmitter 406 and receiver 408 may perform serial communications with a communications system 409. Communication stacks 428 and 426 may be associated with any number of communication protocols that may be operated to support the communication. CRC blocks 410 and 412 are positioned such that communication links 418 and 424 may establish a connection with communication stacks 428 and 426, respectively, via any one of their respective open systems interconnection (OSI) layers as illustrated. For exemplary purposes only, communication link 418 establishes a connection between CRC 410 and communication stack 428, via the transport layer of the communication stack 428. Similarly, communication link 424 establishes a connection between CRC 412 and communication stack 426, via the transport layer of the communication stack 426.

Using such an arrangement, outbound data frames/packets may propagate from, for example, the application layer to the transport layer of the communication stack 428 via communication path 414. Providing that the particular communication protocol in use requires CRC processing on the transport layer, communication path 418 supplies the data packets to CRC block 410 from the transport layer.

The data packets received by CRC block 410 may be treated as a single binary word, $M_1$, and then processed by using a key word, $K_1$. The remainder, $r_1$, left after passing $M_1$ through the CRC process that is controlled by $K_1$, constitutes the residue for the given data packet. The remainder is then passed back to the transport layer via communication link 418 and ultimately passed down to the physical layer via communication link 416 after it is appended to the original word $M_1$. Transmitter 406 then sends both data packet, $M_1$, and residue, $r_1$, to the external communications equipment 409.

The external communications equipment 409 completes the communication link by transmitting data packets to the receiver 408. Communication path 422 of communication stack 426 then delivers the received data packets, $M_2$, to, for example, its transport layer. The transport layer then delivers the received data packets to CRC 412 via communication path 424. CRC 412 checks the data by performing the same calculation, i.e., processing $M_2$ by the same key word $K_1$, and verifying that the residue, $r_2$, received with data packet $M_2$, is equal to the residue $r_1$ transmitted by the external communications system 409. Alternatively, verification of the residue, $r_2$, could be performed by communication stack 426 as well. Once completed, the verified data packets are then provided to the end application via communication path 420.

Figure 5:
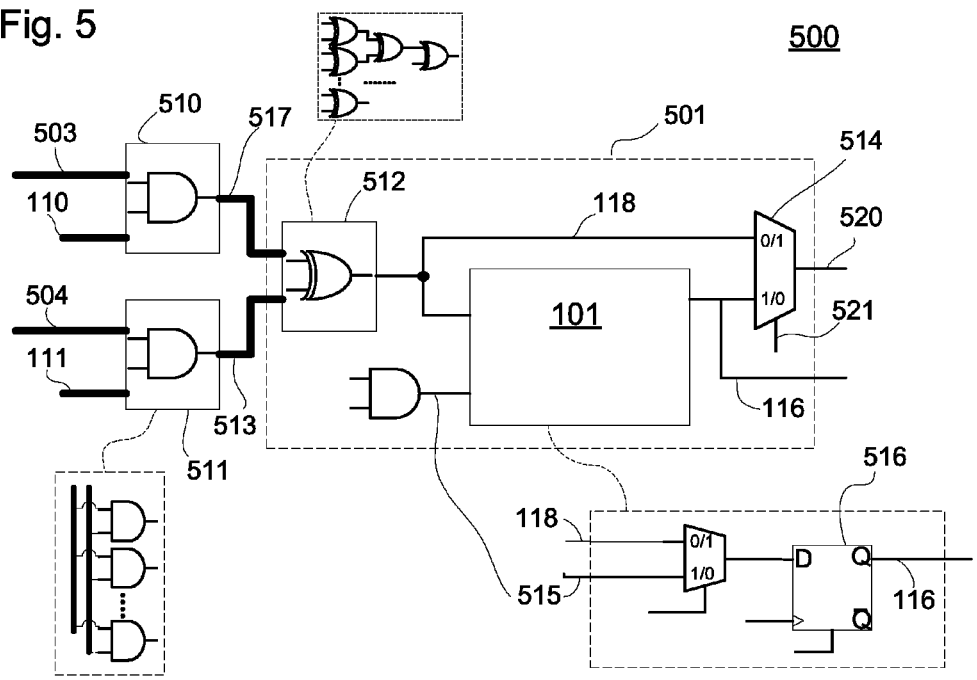
FIG. 5 illustrates a block diagram of a configurable CRC bit-slice according to an embodiment of the present invention.

FIG. 5 illustrates a block diagram including a configurable CRC bit-slice circuit according to an embodiment of the present invention. The CRC bit-slice circuit 100 of FIG. 1 and circuit 500 of FIG. 5 may perform similar CRC error detection function, but circuit 500 has additional advantage, which may include a module that may configure data coupled with a CRC module, e.g., modules 510 and 511. For example, a CRC module including at least one CRC bit-slice circuit 500 capable of performing numerous CRC protocols in response to configuration data. Circuit 500 may be coupled to receive configuration data of signals 503 and 504 providing predetermined data coupled to modules 510 and 511. Modules or circuits 510 and 511 may include a plurality of AND gate circuits or equivalent circuits. Values coupled to signals 503 and 504 may configure circuits 510 and 511 respectively to pass-through or mask one or more bits of signals 110 and 111. In an example, signal 110 may be a generator polynomial, while signal 111 is input data to the CRC bit-slice.

Circuits 510 and 511, for example, may be a part of the CRC bit-slice circuit 501, or they may be a part of an IC including the CRC bit-slice circuit 501. Having the circuits 510 and 511 as a part of the CRC bit-slice circuit may improve performance of the CRC circuit, for example, improved maximum operating frequency by way of optimally placing and routing circuits 510 and 511.

In an example, a design may require a CRC module implemented in a system or an IC to perform various CRC calculations. The CRC calculations may include various CRC protocols and standards, e.g., CRC-5, CRC-16, CRC-32, or a user specific CRC implementation. In such instances, circuits 510 and 511 may be implemented and coupled to predetermined values provided by data lines 503 and 504. Values coupled to signal 504 may gate signal 111 based on a CRC design protocol. For example, predetermined values coupled to bits of signal 504 may gate corresponding bit of signals 111, where the predetermined values of signal 504 may pass-through or mask corresponding bits of signal 111. Signal 513, e.g., output of circuit 511, may provide a version of data coupled to signal 111 based on the predetermined values of signal 504. For instance, the predetermined values coupled to signals 503 and 504 may correspond to a CRC protocol.

For instance, a CRC-16 design protocol may be implemented in a CRC module including numerous configurable CRC bit-slice circuits 500. Values coupled to signals 503 and 504 may configure circuits 510 and 511 respectively to pass-through relevant bits of signals 110 and 111 in accordance with the CRC-16 design protocol. Circuits 510 and 511 may include a plurality of AND gates or equivalent circuits that are well known to persons skilled in the art.

Circuit 501 is a CRC bit-slice circuit including an XOR tree circuit 512, a register circuit 101, and select circuit 515. The XOR tree circuit 512 may include numerous XOR gates or similar circuits coupled to receive, for example, outputs of AND gate circuits 510 and 511, and provide an XOR tree output 118. Circuit 501 may also include select circuit 514 providing an output 520. For example, output 520 may be selectively coupled to the output of the XOR tree 118 or output 116 of register 101 of FIG. 5 based on control signal 512. For example, signal 521 may be a cascade control signal, and the capability of selecting between a registered output, e.g., signal 116, and unregistered output, e.g., signal 118, may increase a CRC design flexibility. Additional details regarding this feature will be described below.

As described above, a CRC module may include numerous CRC bit-slice circuits (e.g., circuit 500) coupled together to perform a CRC calculation based on a CRC protocol. The circuit described in FIG. 5 may be used as a building block to provide a CRC module configurable to meet various CRC error detection protocols, e.g., CRC-5, CRC-16, CRC-24, or CRC-32 standards. For instance, a system may include at least one configurable CRC module, for example, a 32 bit CRC module including 32 instantiations of circuit 500. Each bit-slice circuit 500 may be coupled to receive the same signals 110, 111, but the configuration data, e.g., signals 503 and 504, may be different for each of the 32 instantiations of bit-slice circuits 500. Alternate configurations and size implementation of CRC modules having configurable CRC bit-slice circuits are possible and well known persons skilled in the art. For example, a CRC designer may implement numerous CRC modules, where each module may include 16 instantiations of configurable CRC bit-slice circuit 500. In such instances, each circuit 500 may include signals 110, 111, 503, and 504, where each of the signals is 16 bits wide.

As mentioned above, a CRC module including circuit 500 may be configured to perform various CRC calculations. For example, an IC is provided, where the IC may include a 32 bit CRC module including circuit 500. If a design requires a 24 bit CRC calculation, the 32 bit CRC module may be configured to provide such calculation. For instance, values coupled to configuration signals, e.g., signals 503 and 504 of each circuit 500, may configure the 32 bit CRC module to perform a 24 bit CRC calculation. For example, coupling logic "1" to 24 bits of signal 504 and logic "0" to the other 8 bits of signal 504 masks 8 bits of signal 111. Therefore, signal 513 of circuits 500 may only have 24 active bits of the 32 bits of signal 111. A designer or a user may selectively couple values to configuration data lines, e.g., signals 503 and 504, to configure a CRC module including circuit 500 to implement a desired CRC protocol or standard CRC calculations.

In accordance with an example of the present invention, at least two instantiations of circuit 500 may be coupled together or cascaded, where a register of one instantiation of circuit 500 may be used as a pipeline. In such instances, an XOR tree output of a first CRC bit-slice circuit may be selectively coupled with feedback data of a second CRC bit-slice circuit. The above description of two cascaded CRC bit-slice circuits may be implemented in a bigger scale as will be described with reference to FIG. 8. For instance, the register of a first CRC bit-slice circuit, e.g., register 516, may be utilized as a pipeline register when the first CRC bit-slice circuit is configured to provide an XOR tree output, e.g., signal 118, selectively coupled to signal 520. For example, configuration signals (not shown for simplicity) may configure circuit 101 including register 516 of FIG. 5 to provide a registered version of signal 515 coupled to signal 116. In such instances, the CRC bit-slice circuit provides CRC error calculation coupled to signal 520 and a register that may be used to process data other than CRC data. Register 516 may be utilized in other implementations, for example, a finite state machine (FSM) implementation. Other designs utilizing register 516 may be possible and well known to persons skilled in the art.

In another example, the bit-slice circuit of FIG. 5 may make up a configurable CRC module capable of rearranging or reordering bits based on the configuration data. For example, Ethernet CRC-32 design protocol requires each byte of the output to be reversed. The configurable CRC module including 32 instantiations of circuit 500 is capable of providing such outputs. In such instances, the 24$^{th}$ bit-slice of the configurable CRC module may be designated as the most significant bit (MSB) instead of bit 31. The next bit-slice would the 25$^{th}$ bit-slice instead of bit 30 and so on. The ordering or the rearranging of the bit-slices may be transparent to a user. The bit-slice reordering may be achieved by way of providing configuration data coupled to signal 504 of FIG. 5.

Figure 6:
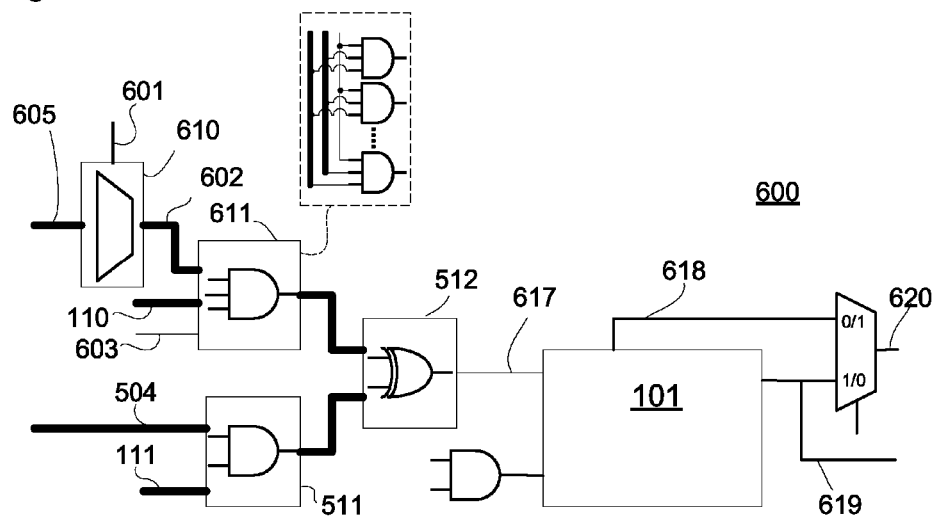
FIG. 6 illustrates a block diagram of a configurable CRC bit-slice according to an embodiment of the present invention.

FIG. 6 illustrates a block diagram of a configurable CRC bit-slice circuit according to an embodiment of the present invention. The CRC bit-slice circuit 600 may include a select circuit 610 coupled to receive signal 605, e.g., configuration data signal, and provide signal 602 based on control signal 601. Values coupled to control signal 601 may configure the select circuit 610 to couple values associated with a group of bits of signal 605 to signal 602 based on CRC protocol (e.g., CRC-16, CRC-40, etc.). For example, incorporating the select circuit 610 in a CRC module may reduce area and resource requirements to implement a configurable CRC design as will be described below.

For example, implementing a 32 bit CRC module utilizing circuit 600 may require 32 instantiations of the CRC bit-slice circuit 600. As mentioned above with respect to FIG. 5, signals 110, 111, 504, and 602 each may be 32 bits wide, while signal 605 may have different bit width. Signal 605 may include 88 configuration bits selectively coupled to signal 602 in a traveling 32 bit window, where the 32 bit window is selected based on the control signal 601. For instance, signal 605 may be coupled to a predetermined value, where the predetermined value may configure the CRC module meeting at least one CRC error detection protocol. In the example above, implementing a 32 bit CRC module including circuit 600, the control signal 601 may be coupled to a predetermined value, where the value of signal 601 may configure the select circuit 610 to selectively couple a group of bits of signal 605 to signal 602 configuring the CRC module to perform the CRC calculation (e.g., CRC-32 calculation). Incorporating circuit 610 in the design of circuit 600 may significantly optimize a design of a CRC module. The significant optimization may be realized in terms of die area, storage resources (e.g., memory), and performance (e.g., speed, and power) as will be discussed below.

FIG. 6 also illustrates that signal 603 may be coupled to circuit 611, where coupling logic "0" to signal 603 may disable circuit 611 (e.g., outputs of circuit 611 are forced to logic "0"). Forcing circuit 611 outputs to logic "0" is described below in more details with respect to the circuit of FIG. 7. The circuit 600 of FIG. 6, for example, may be incorporated in a design of a configurable CRC module. The example discussed above with respect to a 32 bit CRC module, where the 32 bit CRC module may be configured to perform a variety of CRC calculations, e.g., CRC-5 or CRC-24, or a user defined CRC protocol, may also be optimized for various performance parameters and area efficient meeting current and future CRC calculation needs, as will be discussed below with regards to FIG. 7.

According to an example of the present invention, signal 620 may be selectively coupled to signal 618 or signal 619, where signal 618 may represent unregistered version of signal 619 as described above with reference to circuit 500. In an example, signal 618 may be selectively coupled to signal 617 or an inverted version of signal 617. The feature of providing an inverted version or output of the CRC calculation coupled to the output of the CRC circuit 600 may be applicable to a CRC design protocol such as Ethernet CRC-32. In other instances, a user defined CRC error calculation protocol requires providing an inverted version of the CRC bit-slice output when cascading two or more CRC bit-slice circuits.

Figure 7:
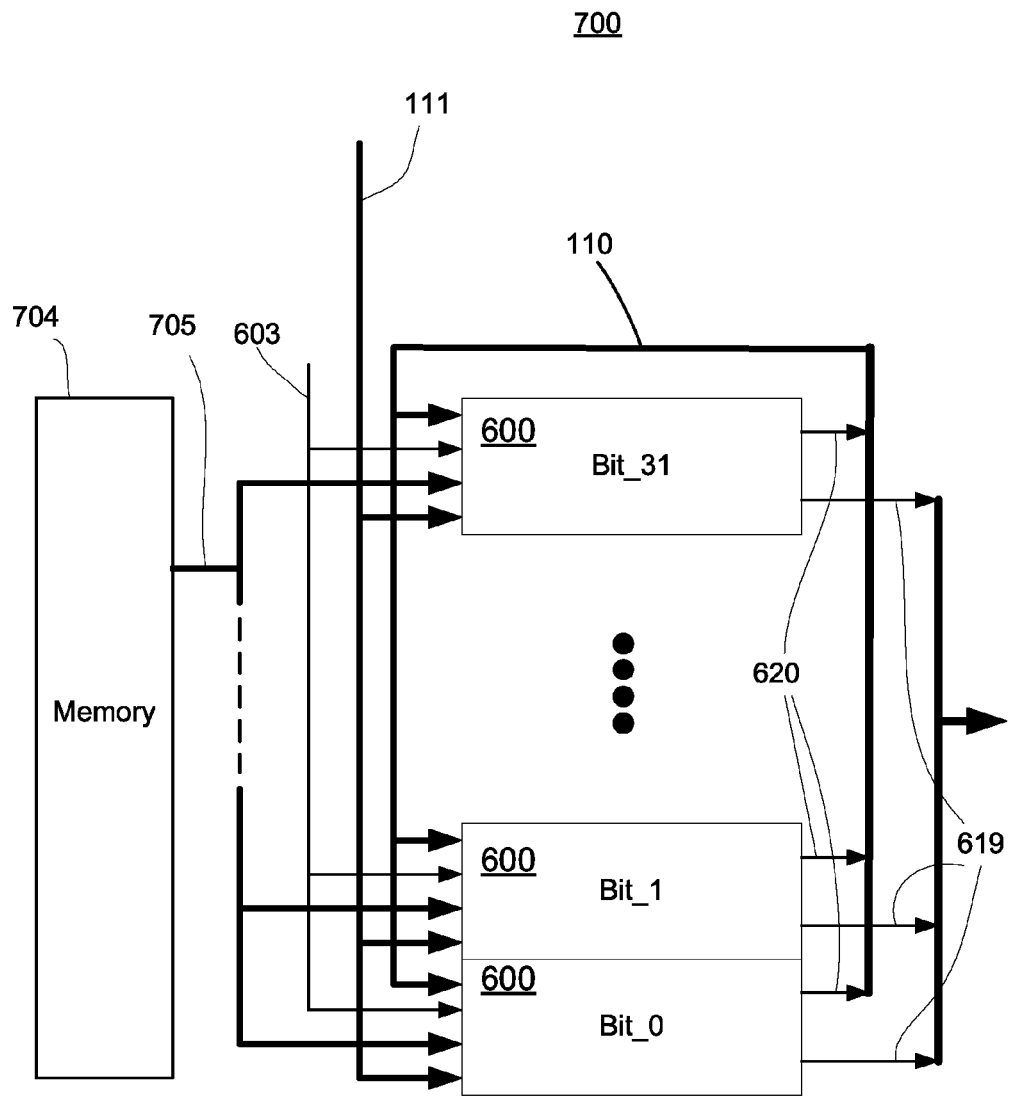
FIG. 7 illustrates a block diagram of a configurable 32 bit CRC module according to an embodiment of the present invention.

FIG. 7 illustrates a block diagram of a configurable CRC module according to an embodiment of the present invention. Circuit 700 is a CRC module including a plurality of configurable CRC bit-slice circuits 600. For example, the memory circuit 704 may provide configuration data coupled to signal 705 according to an example of the present invention. For instance, the configuration data of the memory 704 may configure the CRC module of circuit 700 to perform at least one of numerous CRC calculations, e.g., CRC-5, CRC-24. The circuit of FIG. 7, for example, may provide a configurable 32 bit CRC module, where a user may configure circuit 700 (via data coupled to signal 705) to perform a CRC calculation on data (e.g., signal 111). The circuit of FIG. 7, for example, may be configured to perform CRC calculation on a single bit or all 32 bits of signal 111. Circuit 700 may be configured to meet a wide range of CRC calculation in accordance with a CRC standard or a user defined CRC calculation, which may include input data (e.g., signal 111) widths 1 bit-32 bits. Such configurations, for instance, are made possible by providing appropriate data or predetermined data coupled to the plurality of circuits 600 of the CRC module of FIG. 7.

The memory circuit 704, for example, may include data when coupled to the plurality of circuits 600 (e.g., via signal 705) may configure the plurality of circuits 600 to perform a CRC calculation in accordance with a CRC protocol. Data coupled to signal 705, for example, may include data of signals 504 and 605 described in FIG. 6, where signal 504 may configure input data width (e.g., signal 111), while signal 605 may provide data gating the feedback data 110. Circuit 700 as illustrated, for instance, includes a plurality of circuits 600 instantiations (e.g., 32 instantiations), where the plurality of circuits 600 may be coupled to receive configuration data signal 705, CRC input data signal 111, CRC feedback data 110, and control signal 603. The control signal 603 may be asserted to force the CRC feedback data values to logic low "0". For instance, the above described process may be employed at the beginning of a new data block in order to initialize the CRC register. Additional advantages to implementing the CRC module of FIG. 6 may include improved performance, e.g., throughput, operating frequency, partially due to the elimination of a dead cycle. Introducing a dead cycle (e.g., an extra clock cycle where no calculations are performed) is required in many CRC implementations in order to clear the CRC registers of residual data between data packets. The configurable CRC module 700 may therefore handle CRC calculations on so-called "back-to-back" data packets without the need of a dead cycle or initializing of CRC registers. The elimination of the dead cycle may improve the performance of the CRC module and conserve resources associated with inserting and ideal cycle to initialize registers of the CRC module. In other instances, if the CRC feedback data is a part of the evaluation process (e.g., CRC calculations), coupling logic "1" to signal 603, a portion of signal 705 may gate signal 110 and a CRC calculation may be processed accordingly.

As mentioned above, the 32 bit CRC module of FIG. 7 may include a plurality of circuits 600. Circuit 600 includes a select circuit 610, which selects 32 bits from signal 605, as described above in reference to the circuit of FIG. 6. The CRC module of FIG. 7 may be configured to perform CRC calculations in accordance with a CRC standard (e.g., CRC-8, CRC-16, CRC-24) or user specific CRC calculations. Each CRC calculation (e.g., CRC-24, CRC-32) may require different configuration data (e.g., configuration data of memory 704). Therefore, various sets of configuration data may be stored in the memory 704 to accommodate the different configurations for CRC calculations. According to one embodiment of the present invention, the different CRC calculations (e.g., CRC-8, CRC-24, etc.) may include overlap in configuration data. The overlap in configuration data may enable the generation of a more compact configuration data set that can accommodate the various CRC calculations. The configuration data with overlap data may conserve data area; thereby a smaller size memory may be needed to store such configuration data.

The memory 704 of FIG. 7, for example, may include a configuration data set that may accommodate the various CRC calculations. Select circuits of each on the circuits 600 instantiations may selectively couple a 32 bit data of the memory 704 (via signal 705) corresponding to the CRC calculation that is being performed. For example, if the CRC module of FIG. 7 is configured to perform a CRC-24 calculation, then signal 601 of each CRC circuit 600 of FIG. 7 may be asserted to configure the select circuits (e.g., circuits 601) according to a CRC-24 configuration. The select circuits may selectively couple an appropriate portion (e.g., 32 bits data) of data of signal 705 to be gated with signal 110 in accordance with the CRC configuration for CRC-24 calculation. Other methods of determining configuration data and storage thereof may be possible and well known to persons skilled in the art.

Figure 8:
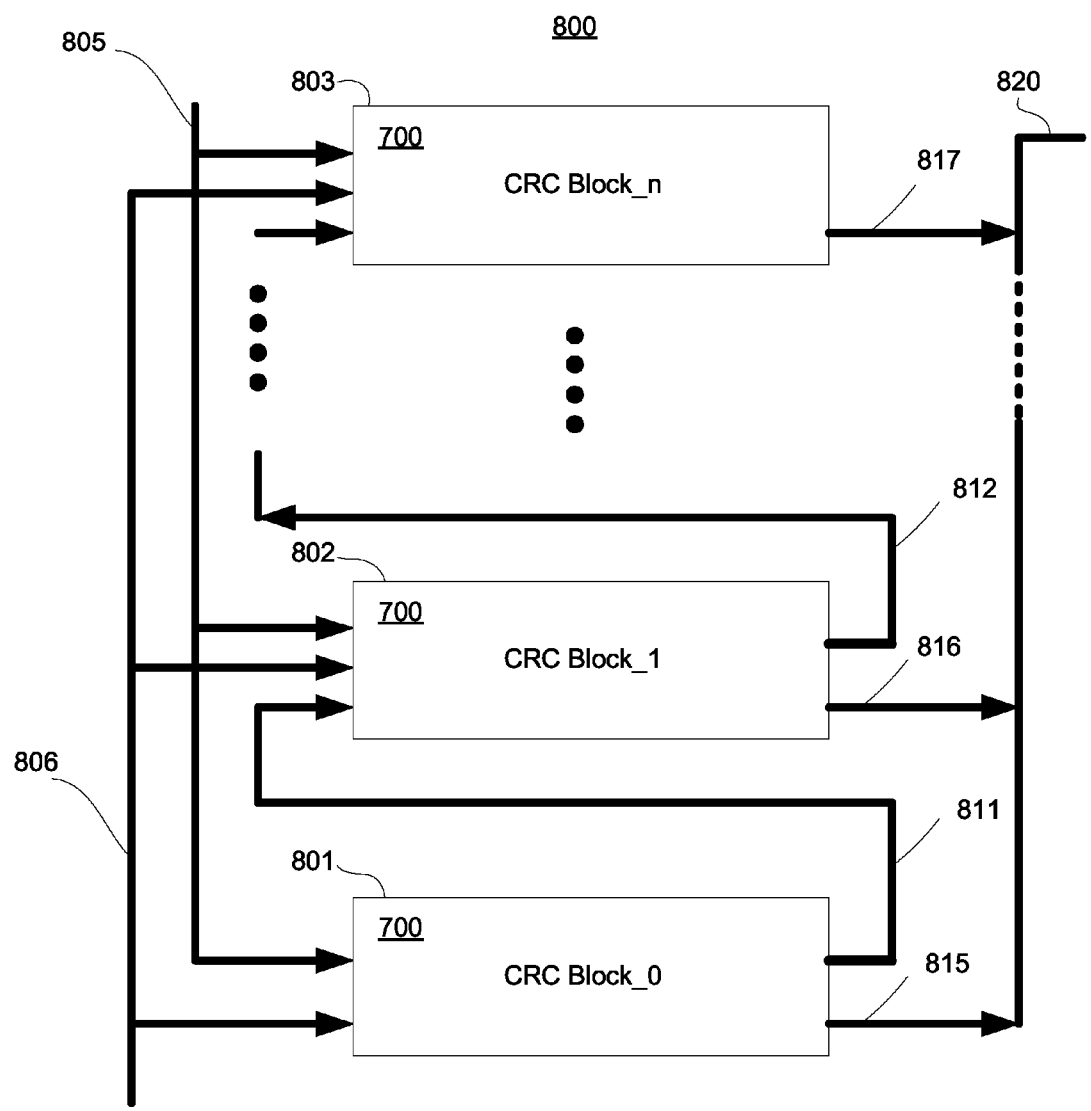
FIG. 8 illustrates numerous configurable 32 bit CRC modules coupled to one another according to an embodiment of the present invention.

FIG. 8 illustrates a block diagram of a plurality of configurable CRC modules coupled together according to an embodiment of the present invention. Circuit 800 shows numerous configurable CRC modules 700 coupled to one another or cascaded forming a CRC module capable of processing input data having greater widths (e.g., 64 bit, 128 bits). According to an embodiment of the present invention, a plurality of configurable CRC modules configured to perform any number of CRC calculations according to a known CRC standard (e.g., CRC-32, CRC-16, etc.) or a user specific CRC calculation is described.

As described above, with respect to circuits 500 and 600, according to an embodiment of the present invention the CRC bit-slice circuits (e.g., circuit 500, and 600) may be configured to provide two outputs. For instance, a first output is a registered CRC output (e.g., signal 619 of FIG. 6) and a second output is selectively coupled to a registered and unregistered CRC output (e.g., signal 620 of FIG. 6). Signals 811 and 812 of circuit 800 may be selectively coupled to unregistered outputs of circuits 801-802 respectively, while signals 815-817 may be coupled to registered outputs of circuits 801-803.

As stated above, circuit 800 may include numerous configurable CRC modules, where all the configurable modules may be similar. For example, circuits 801-803 may be a configurable CRC-16 modules. For instance, circuit 800 illustrates signal 811 (e.g., coupled to unregistered outputs of CRC module 801) is coupled to feedback data path of CRC module 802. Similarly, signal 812 (e.g., coupled to unregistered outputs of CRC module 802) is coupled to feedback data path of the next CRC module. CRC input data coupled to signal 805 may be coupled to circuits 801-803 and may have data width corresponding to a CRC design implementation. Signal 806 (e.g., configuration data) may be coupled to circuits 801-803 as well. Signal 820 (e.g., output of CRC modules 801-803) may include data of a CRC calculation pending evaluation for errors associated with corrupted/incorrect input data (e.g., signal 805).

Figure 9A:
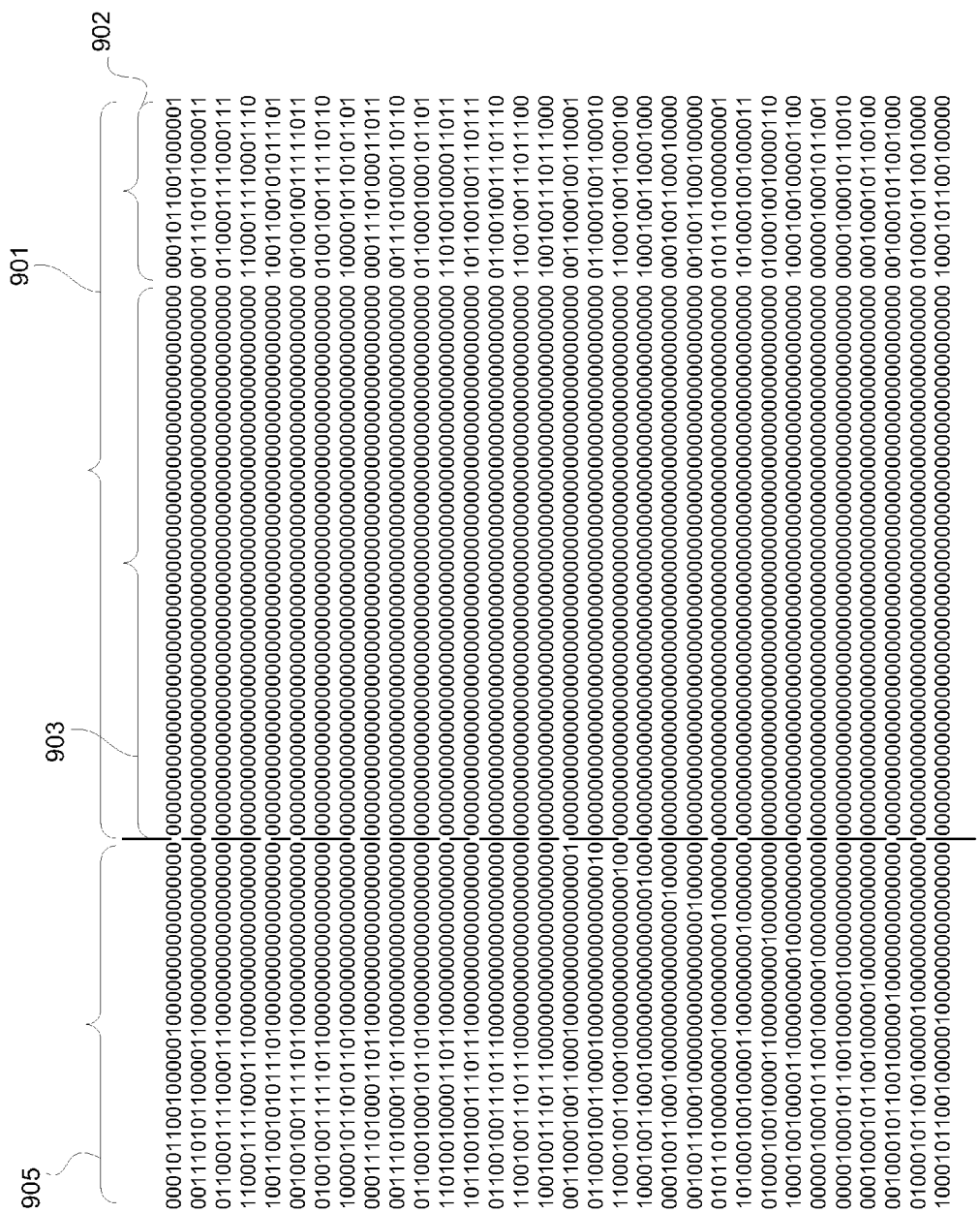
FIG. 9a illustrates a set of CRC feedback and input configuration data pattern.

Turning to FIG. 9a, a set of CRC feedback and data input configuration data pattern is shown. The data pattern shown in FIG. 9a may be coupled to a plurality of AND gate circuits of a 64 bit configurable CRC-32 module (not shown for simplicity) according to an embodiment of the present invention. The data pattern of region 901 may configure width of a CRC input data, while the data pattern of region 905 may configure a CRC feedback data. For example, the 64 bit configurable CRC-32 module may include 2 instantiations of a configurable CRC-32 module, e.g., circuit 700 of FIG. 7. As described above with reference to circuit 700, the CRC-32 module, for example, may include 32 instantiations of circuit 500.

The first region 901 data pattern, for example, may be coupled to signal 504 of circuit 500. The data pattern of region 901 may configure the 64 bit CRC-32 module to calculate 16 bits of input data. Region 901 may include two distinct data patterns represented by regions 902 and 903 of FIG. 9*a*. The data pattern of region 902 includes 16 bits that may configure AND gate circuits of 16 CRC bit-slice circuits to pass through CRC input data. As described above with reference to circuit 500, the CRC bit-slice circuit may include a plurality of AND gates. Table 2 is a truth table of AND gate operation. For instance, "0" represents logic low or "0", "1" represents logic high or "1", and "x" represents a do not care state, meaning it could be a logic "0" or logic "1".

TABLE 2

| IN_1 | IN_2 | IN_z | Output |
|------|------|------|--------|
| 0    | 0    | X    | 0      |
| 0    | 1    | X    | 0      |
| 1    | 0    | X    | 0      |
| 1    | 1    | 1    | 1      |

Coupling logic "0" to an input of AND gate circuit, logic "0" will be provided at the output of the AND gate circuit regardless of values of other inputs, e.g., note logic levels of Output signal of Table 2. The data pattern of region 903 may include 48 bits, where all bits are set to logic "0". The data pattern of region 903 may mask off the remaining CRC input data. For instance, different CRC protocols or standards may require different configuration data patterns represented in FIG. 9*a*, e.g., CRC-32 capable of calculating 24 bits of input data may include different data patterns of regions 901 and 905.

Region 905 of FIG. 9*a* includes data patterns that may be applied to a plurality of AND gates for configuring a feedback data path portion of the 64 bit CRC-32 module. For example, the data pattern 905 includes 32 bits and may be coupled to AND gate circuit 510 of FIG. 5 via signal 503. The data pattern of region 905 may configure the 64 bit CRC-32 module to perform 16 bit CRC error calculations. For instance, different data patterns of region 905 may be required to perform other CRC error calculations. For example, configuration data pattern of region 950 of FIG. 9*b* applied to feedback data path of the configurable 64 bit CRC-32 module is necessary to perform 64 bit CRC error calculations.

Figure 9B:
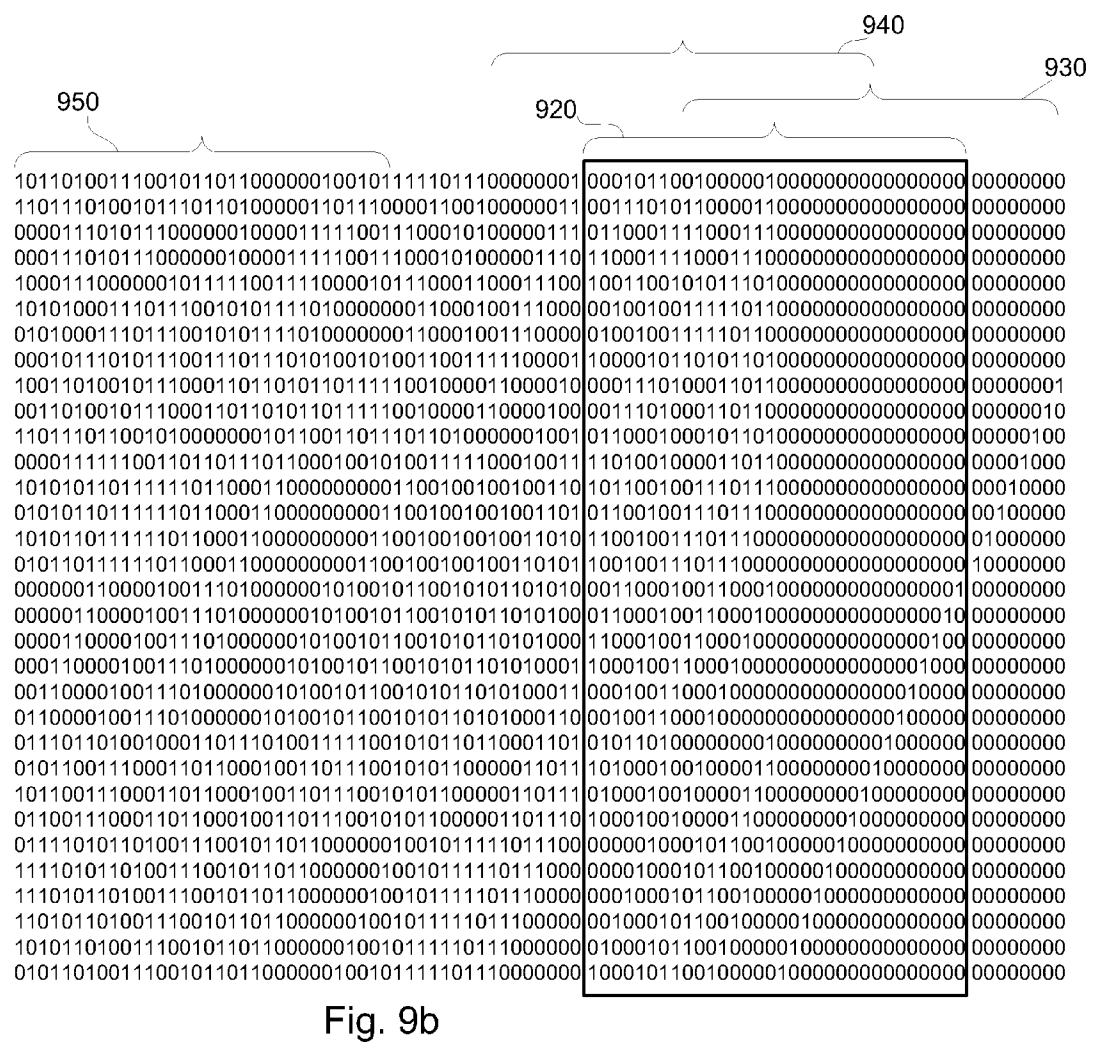

FIG. 9*b* illustrates a set of CRC feedback configuration data patterns. FIG. 9*b* may include a plurality of 32 bit configuration data patterns or windows that may be applied to configure the feedback path of a 64 bit configurable CRC-32 module. Each data pattern window, e.g., windows 920-950, may include a 32 bit data pattern that is coupled to the feedback path of a 64 bit configurable CRC-32 bit module. For example, data pattern 920 may configure the feedback path of the 64 bit configurable CRC-32 bit module to perform 16 bit CRC error calculations. The other data patterns may configure the feedback path of the 64 bit configurable CRC-32 bit module to perform other CRC error calculations. For instance, data pattern 950 may be associated with 64 bit error calculation, while data pattern 940 may be associated with 24 bit error calculations.

For instance, the configurable 64 bit CRC-32 module may include 64 instantiations of circuit 600. A portion of the data pattern of FIG. 9*b* may be coupled to select circuit 610 of circuit 600 via signal 605. For example, control signal 601 may configure the select circuit 610 to selectively couple a configuration data pattern, e.g., data pattern of region 920, with the AND gate module or circuit 611. For instance, selectively coupling data pattern 920 with the configurable 64 bit CRC-32 module may enable such module to perform 16 bit CRC error calculations. According to an embodiment of the present invention, implementing a configurable CRC protocol including the configuration data pattern of FIG. 9*b* may conserve resources, e.g., memory for storing the data pattern for configuring the feedback data path of a configurable CRC module.

Figure 10:
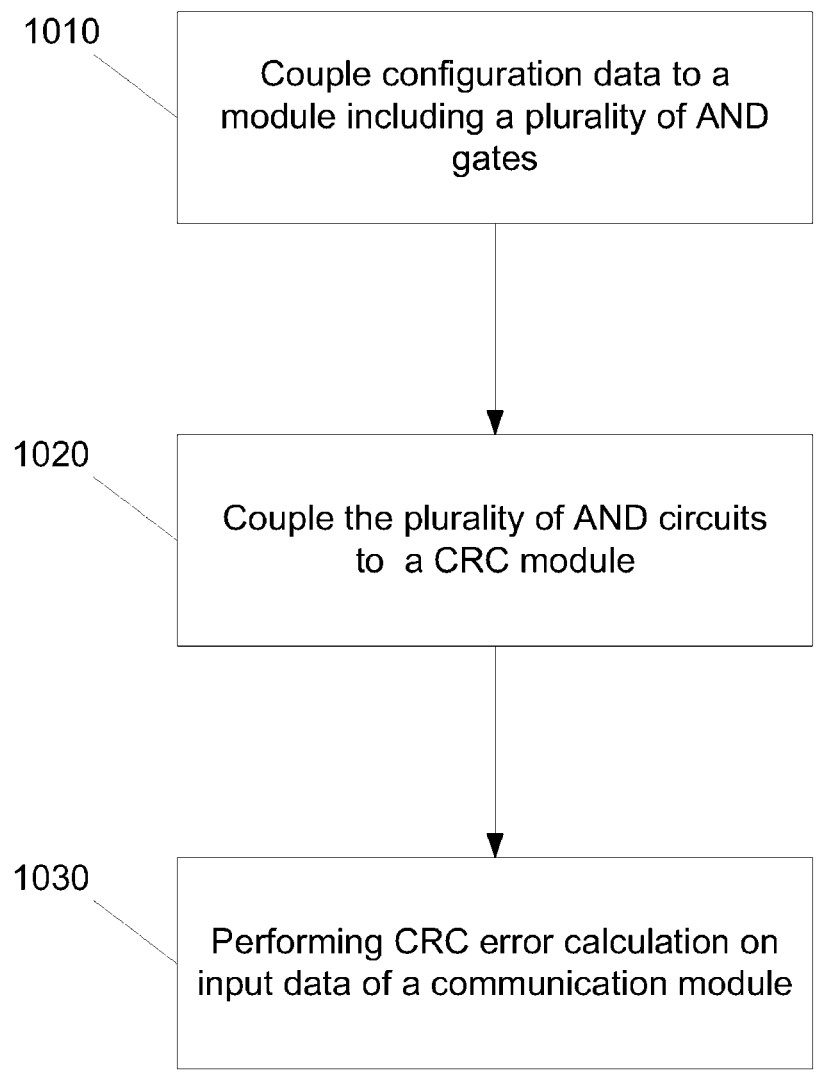
FIG. 10 illustrates a flow diagram of a method for a CRC calculation according to an embodiment of the present invention.

Turning to FIG. 10, a method of CRC calculation is illustrated according to an embodiment of the present invention. The method steps 1010-1030 may be implemented in an IC including at least one CRC error detection module as described above with respect to FIG. 7. The method described below, may add flexibility and/or performance enhancements to an IC including a CRC module. For example, the IC may be configured to perform CRC calculations CRC based on numerous CRC calculation standards, e.g., CRC-64, CRC-24, CRC-5, etc. Additionally, the method may also describe an IC or a system including such configurable CRC module that is capable of performing CRC calculation at faster data rates, e.g., data rates in the frequency range of 400 MHz and above.

At step 1010, data is coupled to a module including numerous AND gates. For example, the data may include configuration data and input data of a CRC module. Also, the numerous AND gates may be grouped, for example, a first group may include AND gates coupled to receive input data and first configuration data, while a second group may include AND gates coupled to receive feedback data of the CRC module and second configuration data. For example, the first configuration data may be different from the second configuration data. For instance, the first configuration data may mask bits of the input data, while the second configuration data may configure a polynomial parameter of the CRC module. In an example, the first configuration data and the second configuration data may be predetermined data stored in a memory. The first and second configuration data may configure the CRC module to perform a CRC calculation in accordance with a user defined CRC calculation or a standard CRC calculation, e.g., CRC-16, CRC-32, etc.

At step 1020, outputs of the numerous AND gates, e.g., the first and second groups of AND gates described above, may be coupled to a CRC module. The CRC module may be a 32 bit CRC module utilized for performing a standard 32 bit CRC calculation or other CRC calculations defined by a design. In another example, an IC may include numerous CRC modules coupled to one another capable of performing CRC calculations on input data having larger number of bits, e.g., 64 bit or 128 bits. At step 1030, a CRC calculation may be performed on the input data in accordance with a user defined or a standard defined CRC calculation. For instance, a user incorporating the method steps described above may configure the CRC module to perform a variety of CRC calculations in accordance with various CRC designs and standards.

Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims. For example, the AND gate circuits 510 and 511 described in FIG. 5 may be replaced with equivalent circuits such as NAND gates.

Moreover, some components are shown directly connected to one another while others are shown connected via intermediate components. In each instance the method of interconnection establishes some desired electrical communication between two or more circuit nodes. Such communication can often be accomplished using a number of circuit configurations, as will be understood by those of skill in the art.

Accordingly, all such modifications and additions are deemed to be within the scope of the invention, which is to be limited only by the appended claims and their equivalents.

What is claimed is:

1. A cyclic redundancy check (CRC) bit-slice circuit, comprising:
    a plurality of AND gates coupled to receive control signals, CRC feedback data, and CRC input data;
    a plurality of XOR gates coupled together forming an XOR tree having inputs coupled to receive outputs of the plurality of AND gates and an XOR tree output;
    a register to provide a register output; and
    a select circuit configured to select which bits of the XOR tree output are provided to an input of the register,
    wherein the control signals configure width of the CRC input data and mask at least one bit of the CRC feedback data to meet a plurality of error detection protocols.

2. The CRC bit-slice circuit of claim 1, further comprising a memory coupled to provide the control signals,
    wherein data of the memory corresponds to at least one error detection protocol of the plurality of error detection protocols.

3. The CRC bit-slice circuit of claim 1, further comprising an output select circuit having an output selectively coupled to the register output and the XOR tree output based on a cascade control signal.

4. The CRC bit-slice circuit of claim 3, wherein the XOR tree output of the CRC bit-slice circuit is selectively coupled with CRC feedback data of another CRC bit-slice circuit.

5. The CRC bit-slice circuit of claim 1, wherein the plurality of error detection protocols comprises at least one of a CRC-5 standard, a CRC-16 standard, a CRC-24 standard, and a CRC-32 standard.

6. A cyclic redundancy check (CRC) circuit, comprising:
    a first plurality of AND gates coupled to receive first data and CRC feedback data;
    a second plurality of AND gates coupled to receive second data and CRC input data; and
    a CRC module including a plurality of CRC bit-slice circuits, wherein each CRC bit-slice circuit comprises:
        a plurality of XOR gates coupled together forming an XOR tree having inputs coupled to receive outputs of the first plurality of AND gates and the second plurality of AND gates;
        a register; and
        a select circuit configured to select which bits of an output of the XOR tree are provided as an input to the register,
    wherein the first data configures a polynomial parameter of the CRC module to meet a plurality of CRC protocols, and
    wherein the second data configures data width of the CRC module to meet the plurality of CRC protocols.

7. The CRC circuit of claim 6, further comprising a memory for storing the first data and the second data.

8. The CRC circuit of claim 7, wherein a portion of the data of the memory configures the plurality of configurable CRC bit-slice circuits to provide inverted outputs based on a CRC protocol of the plurality of CRC protocols.

9. The CRC circuit of claim 7, wherein a portion of the data of the memory configures the CRC module to meet a CRC protocol of the plurality of CRC protocols by rearranging bits of an output of the CRC module.

10. The CRC circuit of claim 6, wherein selectively coupling unregistered outputs of the CRC circuit with CRC feedback data of another CRC circuit enables cascading.

11. The CRC circuit of claim 10, wherein at least one register of the CRC circuit is used as a pipeline register.

12. The CRC circuit of claim 6, further comprising a control signal coupled to the first plurality of AND gates that when asserted enables the CRC circuit to process back-to-back data packets without a dead cycle.

13. A method of performing cyclic redundancy check (CRC), the method comprising:
    coupling configuration data to a plurality of AND gates;
    coupling CRC data to the plurality of AND gates;
    coupling the plurality of AND gates to a CRC module;
    applying a portion of the configuration data to the plurality of AND gates to support at least one error detection protocol of a plurality of error detection protocols;
    masking at least one bit of the CRC data;
    performing a CRC calculation on data provided by the plurality of AND gates; and
    selectively providing, using a select circuit, a result of the CRC calculation to a register.

14. The method of claim 13, wherein the CRC data comprises input data and feedback polynomial data, and
    wherein the portion of the configuration data configures width of the input data and mask at least one bit of the feedback polynomial data.

15. The method of claim 13, wherein the plurality of error detection protocols comprises least one of CRC-5 standard, CRC-16 standard, CRC-24 standard, and CRC-32 standard.

16. The method of claim 13, further comprising selectively providing an unregistered output.

17. The method of claim 16, further comprising coupling the unregistered output of the CRC module to a second plurality of AND gates of a second CRC module.

18. The method of claim 13, further comprising asserting a control signal coupled to the plurality of AND gates to configure the CRC module to process back-to-back data packets without a dead cycle between data packets.

19. The method of claim 13, further comprising selecting different configuration data stored in a memory to meet an error detection protocol of the plurality of error detection protocols.

* * * * *